United States Patent
Boyer et al.

(10) Patent No.: US 7,200,450 B2
(45) Date of Patent: Apr. 3, 2007

(54) DIAGNOSTIC SYSTEM FOR AN APPLIANCE

(75) Inventors: Mark A. Boyer, Harrison, TN (US); Tony E. Kendall, Ooltewah, TN (US); Brian A. Lard, Cleveland, TN (US); Jeffrey C. Strickland, Chattanooga, TN (US)

(73) Assignee: Maytag Corporation, Newton, IA (US)

( * ) Notice: Subject to any disclaimer, the term of this patent is extended or adjusted under 35 U.S.C. 154(b) by 439 days.

(21) Appl. No.: 10/410,358

(22) Filed: Apr. 10, 2003

(65) Prior Publication Data

US 2004/0204780 A1   Oct. 14, 2004

(51) Int. Cl.
*G05B 15/00*   (2006.01)
*G06F 11/00*   (2006.01)

(52) U.S. Cl. .......................................... 700/83; 714/46

(58) Field of Classification Search .................. 700/83, 700/19, 17, 20, 75, 81, 82; 714/46
See application file for complete search history.

(56) References Cited

U.S. PATENT DOCUMENTS

| | | | |
|---|---|---|---|
| 4,245,309 A | | 1/1981 | Kiefer |
| 4,275,464 A | | 6/1981 | Schmidt |
| RE31,864 E | | 4/1985 | van Bavel et al. |
| 4,573,325 A | | 3/1986 | Chiu et al. |
| 4,604,871 A | | 8/1986 | Chiu et al. |
| 4,615,179 A | * | 10/1986 | Chiu et al. ..................... 62/129 |
| 4,628,443 A | | 12/1986 | Rickard et al. |
| 4,630,191 A | * | 12/1986 | Strosser ........................ 700/81 |
| 4,977,394 A | * | 12/1990 | Manson et al. ............ 68/12.27 |
| 5,349,162 A | * | 9/1994 | Holling .................... 219/445.1 |
| 5,378,874 A | | 1/1995 | Holling et al. |
| 5,511,397 A | | 4/1996 | Makino et al. |
| 5,611,867 A | * | 3/1997 | Cooper et al. ................. 134/18 |
| 5,694,793 A | * | 12/1997 | Nishimura et al. ......... 68/12.27 |
| 5,723,846 A | | 3/1998 | Koether et al. |
| 5,841,112 A | | 11/1998 | Brooks et al. |
| 5,940,915 A | | 8/1999 | Nam |
| 6,061,668 A | | 5/2000 | Sharrow |
| 6,687,584 B2 | * | 2/2004 | Andreasen et al. ........... 701/29 |
| 2003/0014707 A1 | * | 1/2003 | Haug et al. .................. 714/758 |
| 2003/0130820 A1 | * | 7/2003 | Lane .......................... 702/184 |

FOREIGN PATENT DOCUMENTS

| | | |
|---|---|---|
| JP | 3-259398 | 11/1991 |
| JP | 05196329 A * | 8/1993 |
| JP | 2002248967 A * | 9/2002 |

OTHER PUBLICATIONS

"Anatomy of the DTC" http://www.obdii.com/dtcanatomy.html/, The OBD II Home Page.*
"OBD-II Background" http://www.obdii.com/background.html/, The OBD II Home Page.*

* cited by examiner

*Primary Examiner*—Thomas Pham
(74) *Attorney, Agent, or Firm*—Diederiks & Whitelaw, PLC

(57) ABSTRACT

A system and method of determining and displaying a failure in an electronic appliance control system employs diagnostic codes which indicate both a primary system where a fault occurs and a subsystem in fault. The diagnostic codes are displayed so that repair personnel may be able to more accurately replace only the faulty part, as opposed to replacing an entire appliance control system. The diagnostic codes are established to include a plurality of digits represented by a combination of letters and numbers. The electronic appliance control also preferably records a specific series of diagnostic steps taken to verify replacement of only an actual faulty component.

17 Claims, 2 Drawing Sheets

DIAGNOSTIC SYSTEM FOR AN APPLIANCE

BACKGROUND OF THE INVENTION

1. Field of the Invention

The present invention pertains to the art of appliances and, more particularly, to a system for diagnosing a fault or failure in a domestic, electronic appliance.

2. Discussion of the Prior Art

In recent years, domestic appliances have been undergoing substantial changes and other advancements. For instance, in the art of cooking appliances, it is no longer the norm to have a family member home all day with time to cook and prepare meals. Today, more and more consumers must rush home from work to prepare meals for themselves or for their families. In today's fast paced society, time is of the essence. The luxury of spending time in preparing a meal is becoming less and less affordable. As such, consumers demand an oven that will cook a meal in less time than conventional ovens, without sacrificing the quality of the prepared food. In order to meet these demands, manufacturers are combining conventional radiant cooking systems with the rapid cook advantages of convection, microwave and other types of cooking systems.

With the increase in the types of available cooking systems, the versatility of current cooking appliances has been greatly enhanced. At the same time, appliance controls have switched over from electromechanical devices to more costly electronic appliance controls. Of course, these additional benefits add considerably to the expense of the control system and its replacement cost. Correspondingly, this advanced technology has significantly added to the manufacturer's warranty expenses.

For at least these reasons, a significant concern in the art of cooking and other domestic appliances is the improper replacement of electronic appliance controls by technicians and service men. All too often, a completely functional control is completely replaced because of a failure of only a sub-system, such as a sensor and the like, that is connected to the electronic control. Obviously, this can represent a cost to the manufacturer which must be controlled. However, the manufacturer has an invested interest in properly fixing any problems which develop with a given appliance. For at least these reasons, there exists a need in the art of appliances for a system which can be used to quickly and accurately diagnose problems with a particular electronically controlled appliance, and also preferably verifying a given diagnosis.

SUMMARY OF THE INVENTION

The present invention is directed to a system and method of evaluating and displaying a failure in an electronic appliance control system through the use of fault codes. In accordance with a preferred embodiment of the invention, diagnostic codes are provided which indicate both the primary system where a fault occurs and the subsystem in fault. The diagnostic codes are displayed so that repair personnel may be able to more accurately replace only the faulty part, as opposed to replacing an entire appliance control system.

Preferably, the diagnostic codes are established to include a plurality of digits represented by a combination of letters and numbers. In accordance with the most preferred embodiment of the invention, a first digit preferably represents the primary system at fault; a second digit indicates whether the failure can be diagnosed or is actually circuit board related; a third digit presents information of the diagnosis; and a fourth digit reflects a particular, faulty part of the appliance or a circuit board fault.

In accordance with another aspect of the invention, the electronic appliance control includes software that records a specific series of diagnostic steps. A security code is adapted to be stored in controller memory to enable verification that the diagnostic steps were followed, preferably prior to replacement of the electronic control system. Diagnostic information can also be saved with reference to real times or dates for added security.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
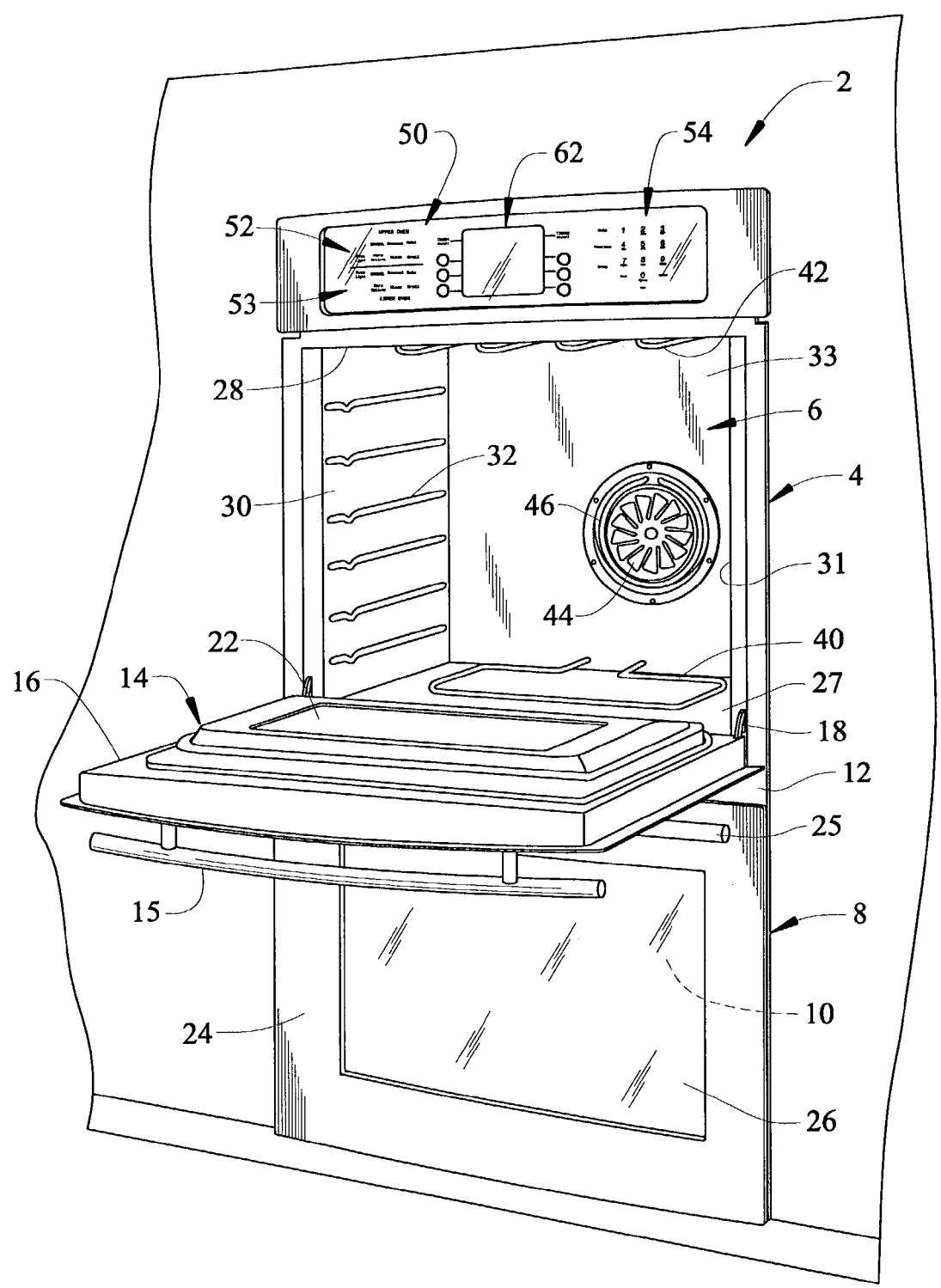
FIG. 1 is a perspective view of a wall oven constructed in accordance with the present invention.

With initial reference to FIG. 1, a cooking appliance constructed in accordance with the present invention is generally indicated at 2. Cooking appliance 2, as depicted, constitutes a double wall oven. However, it should be understood that the present invention is not limited to this or other types of cooking appliances, but rather can be incorporated into various types of domestic appliances, e.g., clothes washing machines, clothes dryers, dishwashers, refrigerators and the like. In any event, in the embodiment shown, cooking appliance 2 constitutes a dual oven wall unit including an upper oven 4 having upper oven cavity 6 and a lower oven 8 having a lower oven cavity 10. Cooking appliance 2 includes an outer frame 12 for supporting both upper and lower oven cavities 6 and 10.

In a manner known in the art, a door assembly 14 is provided to selectively provide access to upper oven cavity 6. As shown, door assembly 14 includes a handle 15 at an upper portion 16 thereof. Door assembly 14 is adapted to pivot at a lower portion 18 to enable selective access to within oven cavity 6. In a manner also known in the art, door 14 is provided with a transparent zone or window 22 for viewing the contents of oven cavity 6 while door 14 is closed. A corresponding door assembly 24 including a handle 25 and a transparent zone or window 26 is provided to selectively access lower oven cavity 10.

As best seen in FIG. 1, oven cavity 6 is defined by a bottom wall 27, an upper wall 28, opposing side walls 30 and 31 provided with a plurality of vertically spaced side rails 32, and a rear wall 33. In the preferred embodiment shown, bottom wall 27 is constituted by a flat, smooth surface designed to improve the cleanability of oven cavity 6. Arranged about bottom wall 27 of oven cavity 6 is a bake element 40. Also, a top broiler element 42 is arranged along upper wall 28 of oven cavity 6. Top broiler element 42 is provided to enable a consumer to perform a grilling process in upper oven 4 and to aid in pyrolytic heating during a self-clean operation. In the preferred form of the invention shown, both bake element 40 and top broiler element 42 are constituted by sheathed electric resistive heating elements.

Based on the above, in the preferred embodiment depicted, cooking appliance 2 actually constitutes an electric, dual wall oven. However, it is to be understood that cooking appliance 2 could equally operate on gas, either natural or propane. In any case, both oven cavities 6 and 10 preferably employ both radiant and convection heating techniques for cooking food items therein. To this end, rear wall 33 is shown to include a convection fan or blower 44. Although the exact position and construction of fan 44 can readily vary in accordance with the invention, in accordance with the most preferred form of the invention, fan 44 draws in air at a central intake zone (not separately labeled) and directs the air into oven cavity 6 in a radial outward direction. Also as clearly shown in this figure, another sheathed electric heating element 46, which preferably takes the general form of a ring, extends circumferentially about fan 44 in order to heat the radially expelled air flow. At this point, it should be noted that a fan cover, which has not been shown for the sake of clarity of the drawings, extends about fan 44 and heating element 46, preferably with the cover having an associated central inlet opening and a plurality of outer radial outlets openings.

Figure 2:
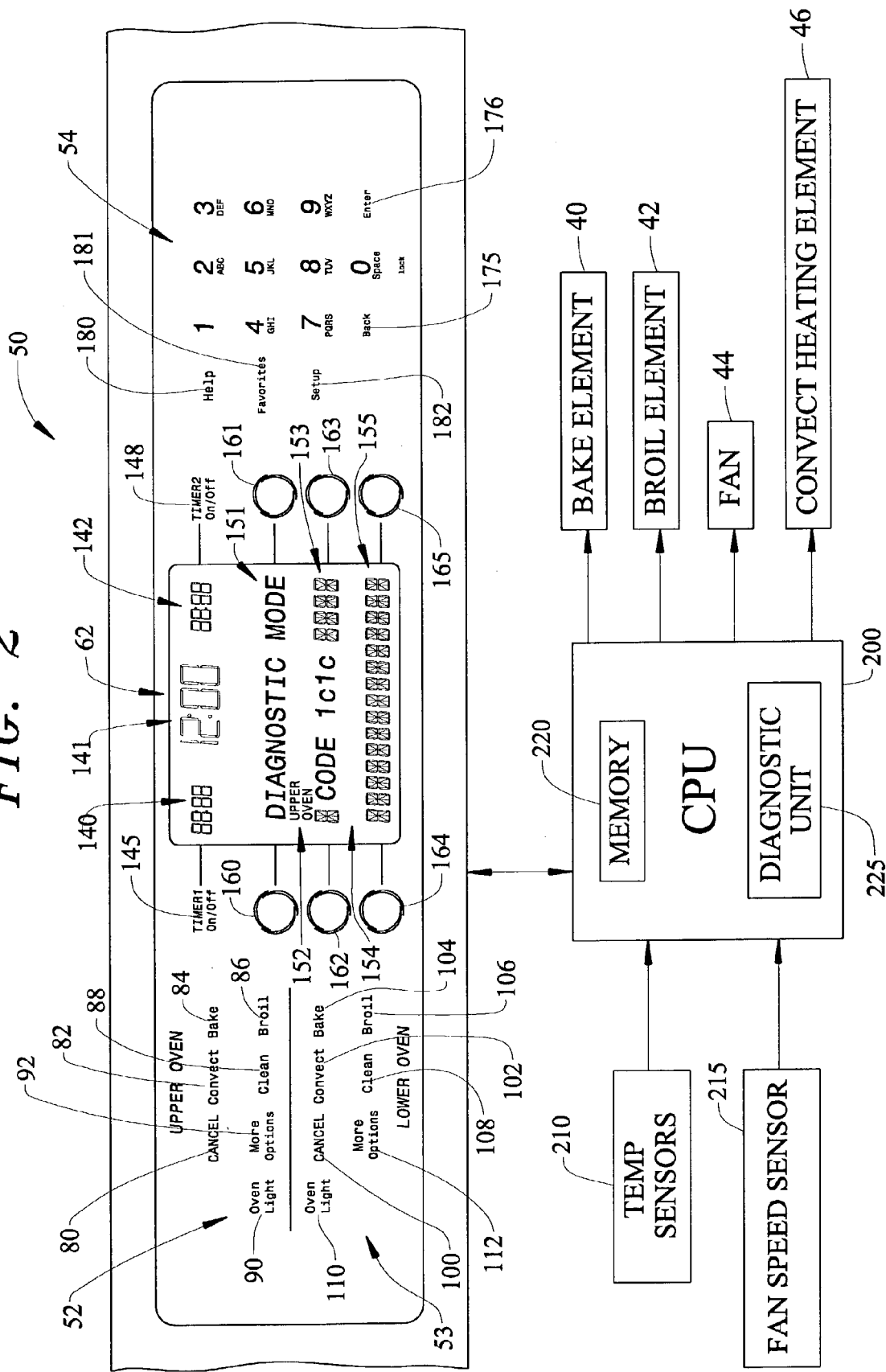
FIG. 2 is an enlarged view of a control panel employed in connection with the wall oven of FIG. 1.

As further shown in FIGS. 1 and 2, cooking appliance 2 includes an upper control panel 50 having a plurality of control elements. In accordance with one embodiment, the control elements are constituted by first and second sets of oven control buttons 52 and 53, as well as a numeric pad 54. Control panel 50 is adapted to be used to input desired cooking parameters for cooking appliance 2. More specifically, the first and second sets of control buttons 52 and 53, in combination with numeric pad 54 and a display 62, enable a user to establish particular cooking operations for upper and lower ovens 4 and 8 respectively.

In the preferred embodiment particularly shown in FIG. 2, first set of control buttons 52 includes a cancel button 80, a convection button 82, a bake button 84, a broil button 86, and a clean button 88. In addition, first set of control buttons 52 also preferably includes an oven light button 90 and a button 92 used to access more cooking options which are conveyed to the user through display 62. In a corresponding manner, second set of control buttons 52 includes a cancel button 100, a convection button 102, a bake button 104, a broil button 106, and a clean button 108. Furthermore, second set of control buttons 53 also preferably includes an oven light button 110 and a button 112 which is used to access more cooking options that are conveyed to the user through display 62.

To this end, display 62 is preferably divided into various sections. In accordance with the most preferred embodiment of the invention, an uppermost section of display 62 is sub-divided into three time display zones 140–142. More specifically, leftmost display zone 140 constitutes a first timer zone having an associated timer button 145. Central display zone 141 constitutes a clock for cooking appliance 2. Rightmost display zone 142 constitutes a second timer zone having an associated timer button 148.

Spaced below time display zones 140–142 are a series of vertically spaced information display zones 151–155. Each of information display zones 151, 153 and 155 has associated left and right portions (not separately labeled). As will be detailed more fully hereinafter, each of the left and right portions have associated therewith laterally positioned selection buttons 160–165. In any case, as will be discussed more fully below, one or more of information display zones 151, 153 and 155 is employed in connection with the present invention to convey diagnostic information to service personnel.

As shown, numeric pad 54 preferably enables alpha-numeric input. That is, in addition to presenting numbers 0–9, numeric pad 54 doubles as an input source for alpha information. To this end, the number 2 button functions for ABC letter entry; the number 3 button functions for DEF letter entry; the number 4 button functions for GHI letter entry; the number 5 button functions for JKL letter entry; the number 6 button functions for MNO letter entry; the number 7 button functions for PQRS letter entry; the number 8 button functions for TUV letter entry; and the number 9 button functions for WXYZ letter entry. The number 0 button can also be used to input a space. On either side of the number 0 button are Back and Enter buttons 175 and 176 which can be used in combination with the various alpha keys for information entry. Finally, provided adjacent numeric pad 54 are Help, Favorites and Setup buttons 180–182.

In general, control panel 50 is linked to an electronic controller or CPU 200 formed as part of cooking appliance 2. Therefore, CPU 200 receives user inputs and selections through control panel 50, as well as signals from sensors associated with cooking appliance 2, i.e. oven temperature sensors for upper and lower ovens 4 and 8 as generally indicated at 210 and a fan speed sensor 215. In turn, CPU 200 controls bake element 40, top broiler element 42, convection fan 44 and convection heating element 46. Since the general programming and operation of cooking appliance 2 does not form part of the present invention, these features will not be discussed further here.

Instead, the present invention is particularly directed to a system and method of determining and displaying a failure in electronic components of cooking appliance 2 through the use of fault codes. In accordance with a preferred embodiment of the invention, CPU 200 incorporates a memory device 220 and a diagnostics unit 225 used to properly store, verify and convey diagnostic information in connection with the proper operation of cooking appliance 2. The faults codes are used by service personnel to pinpoint and accurately determine particular components and/or systems of cooking appliance 2, i.e., particular parts of the overall electronic control system, which are considered to be malfunctioning.

More specifically, diagnostic codes are preferably provided which indicate both a primary system where a fault occurs and a subsystem in fault. The diagnostic codes are displayed in one or more of information display zones 151, 153 and/or 155 so that repair personnel may be able to more accurately replace only the faulty part, as opposed to replacing an entire appliance electronic control system. Preferably, the diagnostic codes are established to include a plurality of digits represented by alpha-numeric data, i.e., a combination of letters and numbers. In accordance with the most preferred embodiment of the invention, a first digit preferably represents the primary system at fault; a second digit indicates whether the failure can be diagnosed or is actually circuit board related; a third digit presents information of the diagnosis; and a fourth digit reflects a particular, faulty oven cavity of the appliance or circuit board fault. Depending on the fault situation, the third and fourth digits can combine to reflect a faulty part and location. For instance, certain potential codes are represented in Table 1 below.

TABLE 1

| | |
|---|---|
| 1c1c | Control related, shorted key |
| 3d11 | Sensor open, upper cavity |

TABLE 1-continued

| | |
|---|---|
| 3d22 | Sensor shorted, lower cavity |
| 4d11 | Door switch open, upper cavity |
| 9d12 | Latch input will not lock, lower cavity |

With this arrangement, a particular, sensed component malfunction can be readily conveyed in display 62 through various diagnostic parameters, as exemplified in FIG. 2, wherein a service technician can quickly and accurately focus on the predetermined faulty component(s). By verifying only the components which must be repaired or replaced, the possibility of the service technician unjustifiably replacing correctly operating components will be minimized or completely prevented. By utilizing the multi-digit coding, the amount of detail available to the service technician is increased. This level of detail is even further increased by the use of both alpha and numeric digits. With this arrangement, a detailed coding system is defined.

In accordance with another aspect of the invention, it is desirable to verify that a service technician, or CPU 200 itself, goes through a proper number and type of diagnostic tests or routines. For instance, CPU 200 preferably includes software that records in memory device 220 a specific series of diagnostic steps. A security code is also adapted to be stored in controller memory device 220 to enable verification that the diagnostic steps were followed prior to component replacement. These steps are preferably stored as a sequence or in combination with the electronic hardware outside of the normal appliance connection. If desired, the diagnostic information can also be saved with reference to real times or dates for added security. In any case, this data can be downloaded from CPU 200 onto a portable unit or directly from CPU 200 and reviewed by personnel to assure that appropriate steps were taken to assure the proper diagnosis, analysis and repair/replacement decisions were made. With this arrangement, in combination with the overall diagnostic code structure set forth above, the possibility of improperly replacing correctly functioning electronic components will be minimized or prevented, thereby representing a significant cost benefit to both the manufacturer and the consumer.

Although described with reference to preferred embodiments of the invention, it should be readily understood that various changes and/or modifications can be made to the invention without departing from the spirit thereof. For instance, although the invention has been described with reference to cooking appliance 2, it should be readily apparent that the invention could be applied to other types of domestic appliances, including dishwashers, clothes washing machines and dryers, refrigerators, and the like. In general, the invention is only intended to be limited by the scope of the following claims.

We claim:

1. A domestic appliance comprising:
a display including a plurality of information display zones capable of displaying alpha-numeric data; and
a control system for the appliance, said control system including a memory device and a diagnostics unit which establishes diagnostic information concerning a malfunctioning component of the appliance, said diagnostic information being presented in the display in the form of an alpha-numeric fault code, with the fault code representing at least three distinct diagnostic related parameters, said diagnostics unit further storing in the memory device information concerning a specified series of diagnostic steps taken by a technician in diagnosing the malfunctioning component of the appliance.

2. A domestic appliance comprising constituted by a dual wall oven having upper and lower ovens comprising:
a display including a plurality of information display zones capable of displaying alpha-numeric data; and
a control system for the appliance, said control system including a diagnostics unit which establishes diagnostic information concerning a malfunctioning component of the appliance, said diagnostic information being presented in the display in the form of an alpha-numeric fault code, with the fault code representing at least three distinct diagnostic related parameters, wherein one of the at least three diagnostic related parameters conveys whether the malfunctioning component forms part of the upper oven or the lower oven.

3. The domestic appliance according to claim 2, wherein one of the at least three diagnostic related parameters conveys whether the malfunctioning component can be diagnosed or is circuit board related.

4. The domestic appliance according to claim 3, wherein one of the at least three diagnostic related parameters identifies a primary system of the appliance which is malfunctioning.

5. The domestic appliance according to claim 4, wherein one of the at least three diagnostic related parameters specifically identifies a location of the malfunctioning component.

6. The domestic appliance according to claim 5, wherein the fault code includes four digits, including at least two numerals and at least one letter.

7. A domestic appliance comprising:
a display including a plurality of information display zones capable of displaying alpha-numeric data; and
a control system for the appliance, said control system including a memory device and a diagnostics unit, said diagnostics unit storing in the memory device information concerning a specified series of diagnostic steps taken by a technician in diagnosing a malfunctioning component of the appliance.

8. The domestic appliance according to claim 7, wherein the control system requires a security code to access the information concerning the specified series of diagnostic steps.

9. The domestic appliance according to claim 7, wherein the information concerning the specified series of diagnostic steps is saved with reference to real time.

10. The domestic appliance according to claim 7, wherein the information concerning the specified series of diagnostic steps is dated.

11. The domestic appliance according to claim 7, wherein the domestic appliance constitutes a dual wall oven having upper and lower ovens.

12. A method of diagnosing a component malfunction in a domestic appliance constituted by a dual wall oven having upper and lower ovens comprising:
sensing the malfunctioning of the component of the appliance;
collecting diagnostic information concerning the malfunctioning component; and
displaying the diagnostic information as an alpha-numeric, multi-parameter fault code in a display of the appliance, wherein the fault code conveys whether the malfunctioning component forms part of the upper oven or the lower oven.

13. The method of claim 12, further comprising: conveying in the display, through the fault code, whether the malfunctioning component can be diagnosed or is circuit board related.

14. The method of claim 12, wherein the fault code is displayed in a four digit format, including at least two numerals and at least one letter.

15. A method of diagnosing a component malfunction in a domestic appliance comprising:
  sensing the malfunctioning of the component of the appliance;
  collecting diagnostic information concerning the malfunctioning component;
  displaying the diagnostic information as an alpha-numeric, multi-parameter fault code in a display of the appliance; and
  storing, in a memory device of the appliance, information concerning a specified series of diagnostic steps taken by a technician in diagnosing the malfunctioning component of the appliance.

16. The method of claim 15, wherein the information concerning the specified series of diagnostic steps is saved with reference to real time.

17. The method of claim 15, wherein the information concerning the specified series of diagnostic steps is dated.

* * * * *